United States Patent [19]

Johnson

[11] Patent Number: 4,811,345
[45] Date of Patent: Mar. 7, 1989

[54] METHODS AND APPARATUS FOR PROVIDING A USER ORIENTED MICROPROCESSOR TEST INTERFACE FOR A COMPLEX, SINGLE CHIP, GENERAL PURPOSE CENTRAL PROCESSING UNIT

[75] Inventor: William M. Johnson, San Jose, Calif.

[73] Assignee: Advanced Micro Devices, Inc., Sunnyvale, Calif.

[21] Appl. No.: 942,472

[22] Filed: Dec. 16, 1986

[51] Int. Cl.[4] .............................................. G06F 11/00
[52] U.S. Cl. ..................................... 371/16; 364/200
[58] Field of Search ....................... 371/15, 16, 17, 18, 371/20; 324/73 R, 73 AT; 364/200 MS File

[56] References Cited
U.S. PATENT DOCUMENTS

| 3,999,053 | 12/1976 | Dalmasso | 371/18 |
| 4,180,203 | 12/1979 | Masters | 371/20 |
| 4,224,690 | 9/1980 | Rockwell | 371/20 X |
| 4,312,066 | 1/1982 | Bantz | 364/200 X |
| 4,500,993 | 2/1985 | Jacobson | 371/20 X |
| 4,520,440 | 5/1985 | Buonomo | 371/16 X |

Primary Examiner—Jerry Smith
Assistant Examiner—Robert W. Beausoliel
Attorney, Agent, or Firm—Joseph J. Kaliko; J. Vincent Tortolano

[57] ABSTRACT

Methods and apparatus are disclosed that facilitate the testing and development of computer systems that include at least one single chip microprocessor. In particular, a parallel test interface is described that allows an external test unit to (1) directly load instructions into the microprocessor under test utilizing the existing bus structure of the computer system; (2) step the processor through preselected test instruction sequences; (3) monitor processor states in both the processor's test and normal execution modes; and (4) halt and resume normal instruction processing. According to the invention, the microprocessor test interface comprises a plurality of dedicated CPU status output pins and a plurality of dedicated CPU control input pins, used by the test unit in combination with the existing bus structure of the computer system to provide the desired test facility for the single chip microprocessor. The preferred embodiment of the invention is realized in a RISC environment where the instruction lengths are fixed and the instruction processor has a single cycle execution time. Such an embodiment facilitates the direct insertion of instructions by the tester into the processor for decoding, without having to queue instructions or pass through complicated intervening hardware or test logic.

34 Claims, 1 Drawing Sheet

METHODS AND APPARATUS FOR PROVIDING A USER ORIENTED MICROPROCESSOR TEST INTERFACE FOR A COMPLEX, SINGLE CHIP, GENERAL PURPOSE CENTRAL PROCESSING UNIT

BACKGROUND OF THE INVENTION

1. Field of the Invention

The invention generally relates to microprocessor test interfaces and more particularly relates to a low cost, user oriented microprocessor test interface suitable for hardware development and testing of a computer system that includes a complex, single chip, general purpose central processing unit (CPU).

2. Description of the Related Art

Methods and apparatus are well known for testing processor units. The earliest approaches, when processors were relatively large, involved interfacing a test unit directly with system buses and critical registers of the processor. The registers and buses were accessible for both factory and end-user testing. As processor units have become smaller, in fact, down to the size where they can be fabricated on a single chip, the feasibility, particularly from a cost point of view, of providing the aforementioned accessibility to the key registers and system buses for test purposes has become a problem.

There are two well known approaches for testing single chip microprocessors. The first approach is Level Sensitive Scan Design (LSSD) testing. The second approach is testing the processor utilizing special purpose test logic added to the chip.

With LSSD testing, the processor state is modified and inspected via large, serial scan strings. A high degree of test coverage is possible, but the amount of time required to perform a test is excessive due to the serial nature of data transfer. Additionally, the implementation of scan strings affects the die size and cost of a chip.

Using the special test logic approach, experience dictates that the logic is difficult to design and maintain. In addition, the special purpose logic can be very sensitive to changes made in processor logic. This approach normally requires special chip bond-outs which are not available to customers for downstream processor testing, system development use, etc.

Methods and apparatus for testing multichip, bit-sliced microcode processors are known which feature parallel test interfaces. The parallel type interface allows for more rapid testing then LSSD type testing approaches and does not suffer from the aforementioned difficulties associated with using special test logic.

Heretofore the parallel test interfaces have not been used in the single chip context. When the processor is spread over several chips, the microinstruction bus and the microinstruction address bus are feasibly (from a cost point of view) accessible to the test unit over the parallel test interface. Control of sequencing can be easily effected over such an interface as well. However, as indicated hereinbefore, the same accessibility becomes a problem in the single chip processor context, explaining why parallel test interfaces have not previously been developed for these processors.

Reduced Instruction Set Computer (RISC) architectures, with their simplified instruction sets and simplified bus structures, lead themselves to the design of parallel test interfaces for single chip processors. Direct access by a test unit over the test interface to RISC data and instruction buses would allow for the direct "feeding" of the processor with test data and instruction sequences. Sequencing control signals can also be easily supplied to a processor in a RISC environment. This obviates the need for special purpose sequencing hardware or test logic, particularly where the RISC processor operates with a single cycle execution time.

The aforementioned features of a RISC architecture, make it ideal for implementing the desired parallel test interface for testing single chip microprocessors.

SUMMARY OF THE INVENTION

Methods and apparatus are disclosed that facilitate the testing and development of computer systems that include at least one single chip microprocessor. In particular, a parallel test interface is described that allows an external test unit to (1) directly load instructions into the microprocessor under test utilizing the existing bus structure of the computer system; (2) step the processor through preselected test instruction sequences; (3) monitor processor states in both the processor's test and normal execution modes; and (4) halt and resume normal instruction processing.

According to the invention, the microprocessor test interface comprises a plurality of dedicated CPU status output pins and a plurality of dedicated CPU control input pins, used by the test unit in combination with the existing bus structure of the computer system to provide the desired test facility for the single chip microprocessor.

The preferred embodiment of the invention is realized in a RISC environment where the instruction lengths are fixed and the instruction processor has a single cycle execution time. Such an embodiment facilitates the direct insertion of instructions by the tester into the processor for decoding, without having to queue instructions or pass through complicated intervening hardware or test logic.

It is an object of the invention to provide a parallel test interface for a single chip microprocessor.

It is a further object of the invention to provide a test interface for a single chip microprocessor that has dedicated test interface pins but does not require extra pins for supplying the processor with data, instructions, addressing or sequencing information.

It is a still further object of the invention to provide a parallel test interface that does not require any special test logic for supporting the testing of the processor using an external test unit.

It is yet another object of the invention to utilize the features and structure of a RISC environment to facilitate single chip processor testing over a parallel test interface.

The invention features a parallel test interface for a single chip microprocessor that reduces testing time when compared to LSSD type testing, while providing comprehensive test coverage comparable to that provided via LSSD testing.

Furthermore, the invention features a test interface that requires no special chip bond-outs and is asynchronous with respect to processor operation, making it convenient for use by end users for hardware development. The novel interface allows end users to perform hardware development at system speeds, which is not possible using prior art in-circuit-emulator approaches.

Further yet, the invention features a test interface that has a minimal number of pins, has a maximum data transfer rate and operates with a minimal cycle time without requiring double clocking.

These and other objects and features of the present invention will become apparent to those skilled in the art upon consideration of the following detailed description and the accompanying Drawing, in which like reference designations represent like features throughout the figures.

DETAILED DESCRIPTION

Figure 1:
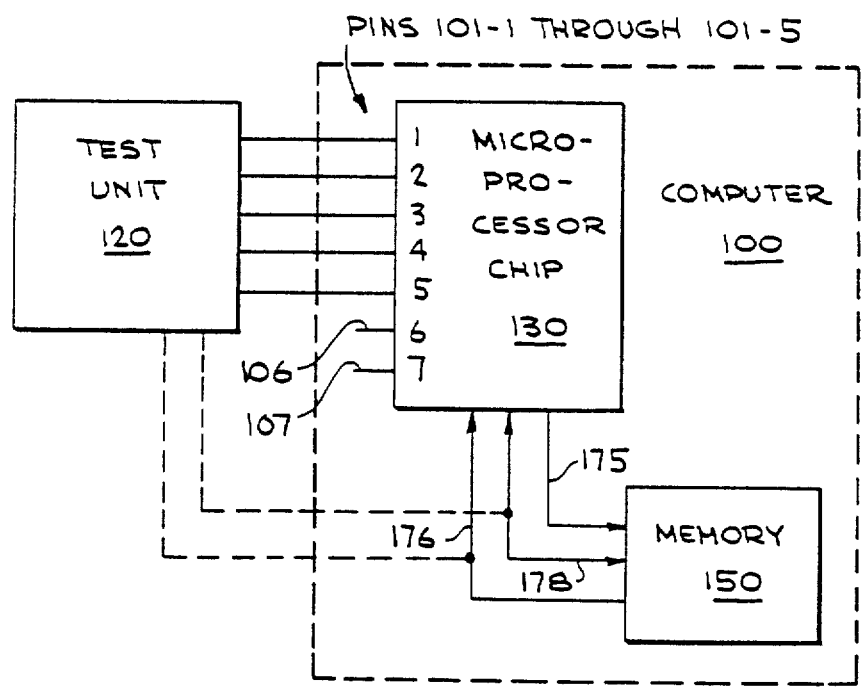
FIG. 1 depicts the novel test interface between an external test unit and a single chip microprocessor.

FIG. 1 depicts, in block diagram form, test unit 120, coupled to single chip microprocessor 130, via dedicated test interface pins 101-1 through 101-5. Microprocessor chip 130 is shown as part of computer system 100 which, for the sake of illustrating the preferred embodiment of the invention, is a reduced instruction set computer. Computer system 100 is shown having a shared address bus, 175, and separate instruction and data buses, 176 and 177 respectively.

Instruction bus 176 is used to provide a path to supply instructions fetched by processor 130 from computer 100's memory 150. The instruction addresses are signalled over address bus 175.

Data bus 178 is used to provide a path between computer 100's memory 150 and processor 130, for data fetched by or data to be stored from the processor. Again, the shared address bus 175 is used to specify the relevant address for the data fetch or store operation.

In addition to pins 105-1 through 105-5, the preferred embodiment of the invention includes pins 106 and 107 for respectively resetting and special purpose testing of processor 130. The manner in which pins 106 and 107 may be used will be described in detail hereinafter.

Test unit 120 may be any of a multiplicity of well known test devices that include external processors, software exercisers, hardware or test development systems, etc. These terms may be used interchangeably to describe test unit 120.

In order to appreciate how the novel test interface works, and how it cooperates with processor 130, the existing bus structure of computer 100 and test unit 120, a description of the various processor states and control information signalled over the test interface will be set forth hereinafter.

As indicated hereinbefore, the interface, at a minimum, is comprised of pins 101-1 through 101-5 as shown in FIG. 1. These pins may be used by external test unit 120 to monitor and control processor 130 for the purposes of processor and system debugging. Pins 101-1 and 101-2 are sometimes hereinafter referred to as the CPU control input pins. Pins 101-3 through 101-5 are sometime hereinafter referred to as the CPU status output pins.

Apart from being used in a test mode, the CPU status output pins may also be used to provide information about processor operations during normal system operation.

If pin 106, the reset pin, is included as part of the interface, the processor may be reset to a predetermined state via this pin. According to the preferred embodiment of the invention, the reset pin may be asserted asynchronously. If pin 107, the test pin, is included in the interface, a hardware tester coupled to this input may be used, according to the preferred embodiment of the invention, o place all processor outputs in a high-impedance (electrically disconnected) state. This would allow the tester to check other system logic by driving processor outputs directly, without requiring that the processor be removed from the system.

Processor 130 can operate in a variety of modes. These modes provide for normal operation of the processor and allow for the desired testing and diagnostics to be performed. The three-bit processor status vector corresponding to the signal that appears on pins 101-3 through 101-5, indicates certain information about the processor modes, along with other information about processor operation.

In addition to being used during normal processor operation, pins 101-3 through 101-5 may, as indicated before, be used to provide feedback of processor behavior when the processor is under the control of a hardware development system. The encoding of these signals, according to the preferred embodiment of the invention, is as follows:

| Pin Number | | | |
| --- | --- | --- | --- |
| 101-3 | 101-4 | 101-5 | Mode or Condition |
| 0 | 0 | 0 | HALT or STEP Modes |
| 0 | 0 | 1 | PIPELINE HOLD Mode |
| 0 | 1 | 0 | LOAD TEST INSTRUCTION Mode |
| 0 | 1 | 1 | WAIT Mode |
| 1 | 0 | 0 | Interrupt Return |
| 1 | 0 | 1 | Taking Interrupt or Trap |
| 1 | 1 | 0 | Non-sequential Instruction Fetch |
| 1 | 1 | 1 | EXECUTING Mode |

On any given cycle, the signal on the CPU status output pins reflects the state of the processor's execute stage on the previous cycle. Where the conditions listed above are not mutually exclusive, the condition listed first in the table above is the one reflected on the CPU status output pins.

A value of 0 on pin 101-3 indicates the processor is idle, and may be used as an indication of processor performance. Since most processor instructions execute in a single cycle, and since extra cycles spent executing load-multiple, store-multiple, and interrupt return operations are counted as PIPELINE HOLD cycles, a count of the number of cycles, within a given time interval, that the processor is not idle (i.e. a count of the number of cycles for which pin 101-3 is a one) is a close approximation to the number of instructions executed within that interval. This provides an approximation of the instruction execution rate. The only source of error in this approximation are the cycles in which the processor decides to take an interrupt or trap. If desired, this source of error can be eliminated by fully decoding the outputs on pins 101-3 through 101-5.

The CPU control input pins, 101-1 and 101-2, can be used asynchronously to force the processor to enter certain modes. According to the preferred embodiment of the invention, the following inputs on pin 101-1 and pin 101-2 respectively, will cause processor 130 to enter the designated mode:

| Pin Number | | MODE |
| --- | --- | --- |
| 101-1 | 101-2 | |
| 0 | 0 | LOAD TEST INSTRUCTION |
| 0 | 1 | STEP |
| 1 | 0 | HALT |
| 1 | 1 | Normal |

In addition to being asynchronous with respect to the processor clock, any changes on the CPU control input pins are restricted so that only pin 101-1 or pin 101-2, but not both, may change in any given processor cycle. This restriction allows the CPU control input pins to be driven directly by an external hardware-development system or tester, without intervening logic. A violation of this restriction would cause unpredictable processor operation. Proper operation is insured by making only single input changes on pins 101-1 and 101-2, and by restricting the interval between all changes to be greater than a processor cycle.

Figure 2:
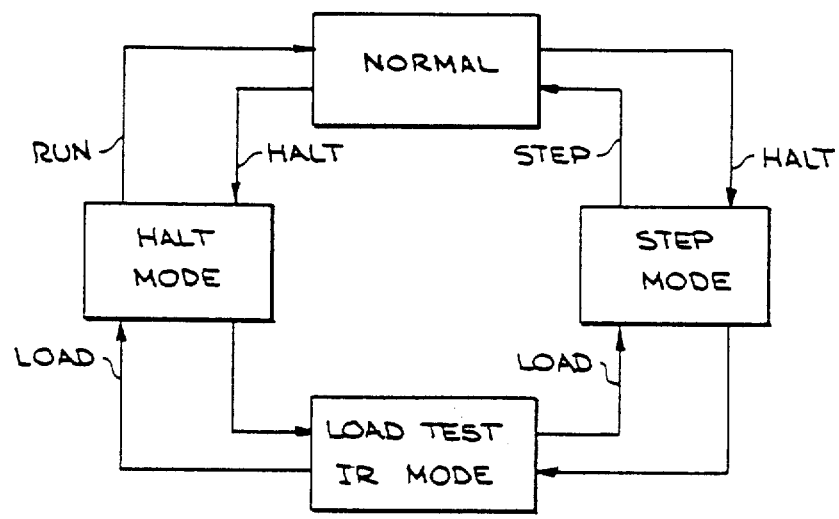
FIG. 2 is a state transition diagram which, in accordance with the preferred embodiment of the invention, depicts the various processor modes and allowable state transitions when testing the processor using the novel test interface.

The transitions allowed in accordance with the preferred embodiment of the invention, are depicted in the FIG. 2 state diagram.

It should be noted that because of the restriction described above, it is not possible to transition directly between all possible modes which are controlled by the CPU control input pins. For example, the processor cannot go from the LOAD TEST INSTRUCTION mode to Normal operation without first entering the HALT or STEP modes.

The various processor modes, are (1) the EXECUTING mode; (2) the WAIT mode; (3) the PIPELINE HOLD mode; (4) the HALT mode; (5) the STEP mode; (6) the LOAD TEST INSTRUCTION mode; (7) the TEST mode and (8) the RESET mode.

The EXECUTING mode is the normal mode of processor operation. The processor executes instructions and performs external accesses. The EXECUTING mode is exited whenever conditions are such that either the WAIT, PIPELINE HOLD, HALT, STEP, or RESET mode is entered. In the EXECUTING mode the CPU status output pins have a value of 111, 110, 101, or 100.

When in the WAIT mode, the processor neither fetches nor executes instructions, and performs no external memory accesses. WAIT mode is exited when an interrupt or trap occurs. The WAIT mode is indicated by a value of 011 on the CPU status output pins.

The PIPELINE HOLD mode is activated whenever sequential pipeline flow cannot be maintained. When this mode is active, the pipeline stages do not advance and most internal processor states are not modified. By way of example, the processor places itself in the PIPELINE HOLD mode when any of the following occurs:
1. A trap or interrupt is taken.
2. The processor requires an instruction which has not been returned by an external instruction memory.
3. The processor requires data from an in-progress load which has not been returned by an internal data memory or device.
4. The processor is performing a load or store operation but must wait for the address bus to become available.
5. The processor attempts to execute a load or store instruction while another load or store is in progress.
6. A multiple load or multiple store instruction is executed.
7. An interrupt return instruction is executed.

The PIPELINE HOLD mode is exited whenever the conditions causing the hold no longer exist. The PIPELINE HOLD mode is indicated by a value of 001 on the CPU status output pins.

The HALT, STEP, and LOAD TEST INSTRUCTION modes of operation are defined to support the debug of the processor system (both hardware and software) in a development environment. These modes will now be described along with the corresponding activity on pins 101-1 through 101-5.

The HALT mode is invoked by the application of a value of 10 to pins 101-1 and 101-2. If the change to these pins meets proper set-up-time criteria, i.e., approximately two to three clock cycles with respect to the system clock, depending on the proximity to a clock cycle boundry when the change occurs, the processor enters the HALT mode on the second following clock cycle, except that it first completes any external data access in progress The CPU status output pins have a value of 000 whenever the processor is in the HALT mode; these outputs can be used as a verification that the processor is in the HALT mode. If a burst-mode instruction access is established before the processor enters the HALT mode, i.e., if instructions are being fetched from sequential addresses in sequential cycles as part of the execution of instructions, the access remains established when the processor enters the HALT mode, but is suspended.

The HALT mode is also entered as the result of the execution of a HALT instruction. When a HALT instruction is executed the processor enters the HALT mode on the next cycle, except that it completes any external data accesses in progress. In this case, the processor remains in the HALT mode even though the CPU control input pins have the value 11. However, the processor remains in the HALT mode until these inputs are changed, or until the RESET mode is entered.

While in the HALT mode, the processor does not execute instructions and performs no external accesses. The system's timer facility does not operate (i.e. the timer counter register does not change) while the processor is in the HALT mode. The HALT mode is exited whenever the RESET mode is entered, or the CPU control input pins place the processor into another mode. The only valid transitions on these pins from the value of 10 are to the value 00, which places the processor into the LOAD TEST INSTRUCTION mode, and to the value 11, which causes the processor to resume normal execution.

The HALT mode is useful for both software debugging and hardware diagnostics since it allows processor 130 to be stopped while preserving its internal state. The HALT mode is defined so that normal operation may resume from the point at which the processor enters the HALT mode. Since all external accesses are completed before the HALT mode is entered, a minimum amount of system logic is required to support the HALT mode.

The STEP mode is invoked by the application of a value of 01 to the CPU control input pins. If the change to these pins meets the proper set-up-time criteria, the processor enters the STEP mode on the second following clock cycle, except that it first completes any external data access in progress. The CPU status output pins have a value of 000 whenever the processor is in the STEP mode; these outputs can be used as a verification that the processor is in the STEP mode. If a burst-mode instruction access is established before the processor enters the STEP mode, it remains established when the processor enters the STEP mode, but is suspended.

While in the STEP mode, the processor does not execute instructions, and performs no external accesses. Again, as with HALT mode, the timer facility does not operate in STEP mode. The STEP mode is exited whenever the RESET mode is entered or the processor is placed into another mode via the CPU control input pins.

The STEP mode is identical to the HALT mode in every respect except one. This difference is apparent on the transition of the CPU control input pins from the value 01 (STEP mode) to the value 11 (Normal). On this transition, the processor steps. That is, the processor state advances by one pipeline stage, and it completes any external access which is initiated by this state change. If the processor enters the PIPELINE HOLD mode immediately after the transition on pins 101-1 and 101-2, the step may require multiple cycles to execute, since the processor pipeline cannot advance while the processor is in the PIPELINE HOLD mode. The CPU status output pins reflect the state of the processor for every cycle of the step; pin 101-3 has a value of 1 for one cycle before the step completes. The system timer counter decrements by one for every cycle of the step; if the timer counter decrements to zero, the usual timer-facility actions are performed, and a timer interrupt may occur.

After the step is performed, the processor re-enters the STEP mode, and remains in the STEP mode even though the pin 101-1 and 101-2 inputs have the value 11. This prevents the need for a time-critical transition on these inputs. The processor remains in this condition until the control inputs transition either to the value 10 or to the value 01. The transition to the value 10 causes the processor to enter the HALT mode, and is used to clear the STEP mode and resume normal operation. The transition to the value 01 causes the processor to remain in the STEP mode, so that it may perform additional steps.

The STEP mode causes the processor to execute at a rate determined by the hardware-development system. Because of this the STEP mode allows the hardware-development system to monitor the processor system even though the hardware-development system executes at a much slower rate. Since all external accesses are completed during any step, a minimum amount of system logic is required to support the slower rate of execution.

The processor incorporates an Instruction Register (IR) which holds instructions while they are decoded. In the LOAD TEST INSTRUCTION mode, the IR is enabled to receive the content of the Instruction Bus, regardless of the state of the processor's Instruction Fetch Unit. This allows a hardware-development system to directly provide instructions for execution, thereby providing means for the hardware-development system to examine and modify the internal state of the processor without altering the processor's instruction stream. The LOAD TEST INSTRUCTION mode can be entered only from the HALT or STEP modes.

The hardware-development system can place an instruction in the IR by first placing 00 on pins 101-1 and 101-2. If the change on these pins meets the proper set-up time criteria, the processor enters the LOAD TEST INSTRUCTION mode on the second following cycle, except that it first preempts any established burst-mode instruction access. The CPU status output pins have a value of 010 while the processor is in the LOAD TEST INSTRUCTION mode; this may be used as a verification that the processor is loading the IR.

While the processor is in the LOAD TEST INSTRUCTION mode, the IR is continually storing the value on the Instruction Bus; any change in the value on this bus is reflected in the IR on the next cycle. The hardware-development system can place a desired instruction into the IR by driving this instruction on the Instruction Bus. The value of any instruction ready or instruction error signals are irrelevant in the LOAD TEST INSTRUCTION mode.

The processor exits the LOAD TEST INSTRUCTION mode in the second cycle following a change on the control inputs. The only valid change here is either to the HALT mode (10 on the CPU control input pins) or the STEP mode (01 on the CPU control input pins).

When the LOAD TEST INSTRUCTION mode is exited, the most recent value stored into the IR is held. If the processor is placed in the STEP mode, the IR is marked as having valid content, enabling the processor to decode and execute the instruction. If the processor is placed in the HALT mode, it ignores any instruction placed in the IR by the LOAD TEST INSTRUCTION mode, and reverts to its normal instruction-fetch mechanism.

Once the IR has been set by the LOAD TEST INSTRUCTION mode, the instruction in the IR may be executed via the STEP mode described hereinbefore. A single step is sufficient to cause the execution of this instruction. However, because of pipelining, multiple steps may be required before the instruction completes execution. If more than one step is performed, the processor executes the instruction in the IR on every step. If it is desired to step an instruction to completion without repeated execution, a no-op may be set into the IR (using the LOAD TEST INSTRUCTION mode) after the first step.

The LOAD TEST INSTRUCTION mode may be used to cause the execution of any valid processor instruction. This allows the inspection and modification of any processor state which is normally allowed by instructions.

Instructions executed via the LOAD TEST INSTRUCTION mode may also be used to access any external device or memory. Recall that the processor completes any data access before completing a step. This allows the processor to access devices and memories on behalf of the hardware-development system, and simplifies the timing constraints on the hardware-development system.

During processor execution via the LOAD TEST INSTRUCTION mode, the processor retains the information required to restart the instruction which was being decoded when the processor entered the STEP or HALT modes. If any state modified by the hardware-development system is properly restored, execution may resume with this instruction at some later point in time.

What has been described in terms of processor modes and the dedicated input control and output status pins, is an extremely flexible test and development interface. The following is an illustrative sequence performed by a hardware-development system during debug:

1. Halt the processor either by a HALT instruction or by a 10 on the CPU control input pins. The HALT instruction may be used as a primitive in the implementation of a general instruction-breakpoint capability.

2. Load the IR with an instruction to inspect or alter the processor state. The control inputs are set to the value 01 after the IR is loaded (00 while being loaded).
3. Step the processor by a transition of the control inputs from the value 01 to 11 and back to 01. Data may be supplied on the Data Bus during one of the steps.
4. Repeat steps 2 and 3 as desired.
5. After the final step, enter the HALT mode by placing the value 10, instead of the value 01, on the control input pins (101-1 and 101-2).
6. Resume normal execution by placing the value 11 on the control pins.

TEST mode is controlled by pin 107. In TEST mode, the operation of the processor is unchanged, except that all processor outputs, except a master/slave error signal, are forced to the high-impedance state. This allows the processor outputs to be driven by an external device. In addition, it provides the mechanism by which master/slave checking can be accomplished. A high level of fault detection is possible in a system which incorporates two processors for master/slave operations. The first processor is used normally, and the second processor operates in TEST mode, checking the outputs of the first.

The TEST mode may be invoked regardless of the processor's operational mode. For example, the TEST mode is not affected by the HALT mode. The disabling of processor outputs is performed combinatorially; i.e.,it occurs e though no clocks are applied to the processor.

For certain outputs, the transition to the high-impedance state which results from the TEST mode may occur at a much slower rate than similar transitions which occur during normal system operation, (for example, when the processor reliquishes control of the channel to another master). For this reason, the TEST mode may not be appropriate for special, user-defined tests.

The TEST mode allows the processor outputs to be driven directly for testing or diagnostic purposes. Because of the TEST mode, the processor outputs do not interfere electrically with externally-supplied signals. This, as indicated previously, allows checking the computer system without processor removal.

Asserting the RESET pin, 106, causes the processor to enter the Reset mode regardless of its current mode. When power is first applied to the processor it is in an indeterminate state and must be placed in a known state. Also, under certain other circumstances it may be necessary to place the processor into a defined state. The RESET mode may be used to accomplish this.

The RESET mode is invoked within 4 processor cycles of asserting pin 106. If the RESET pin is asserted while power is applied to the processor, the processor enters the RESET mode only after the four cycles have occurred.

The RESET mode is exited when the RESET input is de-asserted. Either 3 or 4 cycles after RESET is de-asserted (depending on internal synchronization time), the processor performs an initial instruction access. The initial instruction access is directed to address 0 in the Instruction-Read-Only-Memory (ROM) address space. If instruction ROM is not implemented in a particular system, another device or memory must respond to this instruction-fetch request.

If the CPU control input pins have a value of 10 or 01 when the initial instruction fetch completes, the processor enters the HALT or STEP mode. Before the completion of the initial instruction fetch, the value of the control inputs is irrelevant. However, the LOAD TEST INSTRUCTION mode cannot be directly entered from the RESET mode; if the control inputs have a value of 00 here, the effect on processor operation is unpredictable. If the control inputs have the value 11, the processor enters the EXECUTING mode.

The novel test interface described hereinbefore is asynchronous to the processor clock input and thus may be driven directly by an external processor, such as a tester or hardware development system, directly under the control of software in the external processor. The interface allows the external processor to place processor 130 in the HALT mode, to trace the execution of instructions on an instruction-by-instruction basis, and to inspect and alter the state of processor 130 and external devices and memories.

By the proper invocation of the processor modes described herein, via the CPU control input pins, where the modes are acknowledged by the CPU status output pins, the external processor may cause the execution of any instruction sequence. The instructions in this sequence may be part of the processor's normal execution stream or may be supplied by the external processor via the instruction register. In general, any program-visible state can be inspected and modified by the proper sequence of loads, stores, and moves, with the external processor supplying and reading data on the data bus lines as required. Implementation-dependent instructions which can be defined for the instruction register, allow the inspection of states which are not normally available to instructions. In addition, load and store instructions executed via the instruction register may cause the processor to access external devices and memories on behalf of the external processor. Such accesses still occur to and from the processor 130's general-purpose registers, but the content of these registers may be inspected and read by the external processor.

The external processor may gain control of processor 130 at a statically-predetermined location in a program by placing a HALT instruction at the desired location; this is accomplished while the processor is in the HALT mode. The HALT instruction replaces the instruction originally at that location. After the processor is placed in the EXECUTING mode, it enters the HALT mode when it executes this instruction. After the processor enters the HALT mode, the instruction which was replaced by the HALT instruction may be executed using the interface.

Access links to and from the data and instruction buses of the RISC computer are shown in dashed lines in FIG. 1. These links may be hardwire connections between test unit 120 and the buses. One of ordinary skill in the art will readily appreciate that buffering may be required to accommodate the processing chip's cycle time and the speed at which information is carried over the interface. Again, according to the preferred embodiment of the invention, a single cycle execution time for the processor chip minimizes the amount of required buffering, sequencing control signalling, etc. that would otherwise have to be performed.

What has been described are methods and apparatus for testing a single chip microprocessor via a low cost, user oriented parallel test interface. These methods and apparatus meet the objectives set forth hereinbefore.

The foregoing description of a preferred embodiment of the novel methods and apparatus has been presented for the purposes of illustration and description only. It is not intended to be exhaustive or to limit the invention to the precise form disclosed, and obviously many modifications and variations are possible in light of the above teaching.

The embodiment and examples set forth herein were presented in order to best explain the principles of the instant invention and its practical application to thereby enable others skilled in the art to best utilize the instant invention in various embodiments and with various modifications as are suited to the particular use contemplated.

It is intended that the scope of the instant invention be defined by the claims appended hereto.

What is claimed is:

1. A parallel test interface for coupling a single chip microprocessor (CPU), included in a reduced instruction set computer (RISC) system, to an external test unit, wherein the parallel interface and test unit combination are designed for debugging the CPU hardware and associated software, comprising;
    (a) means for enabling said test unit to monitor said CPU to determine which of a plurality of processing modes said CPU is in;
    (b) means for enabling said test unit to signal said CPU to enter specified ones of said processing modes;
    (c) means for coupling said test unit to the instruction bus of said RISC system to thereby enable said unit to place instructions directly onto said bus; and
    (d) means for coupling said test unit to the data bus of said RISC system to thereby enable said unit to place data directly onto and take data directly off of said data bus, whereby the test unit/parallel interface combination may be used to debug the CPU hardware and associated software.

2. A parallel test interface as set forth in claim 1 wherein said means for enabling said test unit to monitor is comprised of a plurality of dedicated CPU status output pins on said chip.

3. A parallel test interface as set forth in claim 2 wherein said means for enabling said test unit to signal is comprised of a plurality of dedicated CPU control input pins on said chip.

4. A parallel test interface as set forth in claim 3 wherein preselected code signals placed on said CPU control input pins, by said test unit, cause said processor to execute and make available, to said test unit, the results of executing at least one test instruction placed onto said instruction bus by said test unit.

5. A parallel test interface as set forth in claim 4 wherein said plurality of processor modes include a processor HALT, STEP and LOAD INSTRUCTION REGISTER mode, each of which modes may be entered by said test unit applying one of said preselected code signals to said CPU control input pins.

6. A parallel test interface as set forth in claim 5 which further includes means for enabling said test unit to communicate a reset signal to said processor to cause said processor to enter a predefined reset state.

7. A parallel test interface as set forth in claim 6 wherein said means for enabling said test unit to communicate a reset signal is comprised of a dedicated CPU reset pin on said chip.

8. A parallel test interface as set forth in claim 7 wherein said plurality of processor modes includes a RESET mode entered whenever said CPU reset pin is asserted.

9. A parallel test interface as set forth in claim 8 which further includes means for enabling said test unit to drive the outputs of said processor to a high-impedance state.

10. A parallel test interface as set forth in claim 9 wherein said means for enabling said test unit to drive is comprised of a dedicated CPU test pin on said chip.

11. A parallel test interface as set forth in claim 10 wherein said test pin provides a means for disabling processor outputs to facilitate master/slave fault detection.

12. A parallel test interface as set forth in claim 11 wherein said plurality of processor modes include a processor TEST mode which is entered whenever said CPU test pin is asserted.

13. A parallel test interface as set forth in claim 12 wherein said plurality of processor modes includes a processor EXECUTING, WAIT and PIPELINE HOLD mode, each of which may be monitored via said CPU status output pins.

14. A parallel test interface as set forth in claim 13 wherein said EXECUTING mode may be entered by said test unit applying one of said preselected code signals to said CPU control input pins.

15. A parallel test interface as set forth in claim 14 which is asynchronous with respect to the computer system.

16. A parallel test interface for coupling a single chip microprocessor (CPU) included in a reduced instruction set computer (RISC) system, to an external test unit, wherein said computer system includes an instruction bus and a data bus which couple said processor to the memory of said computer system, and further wherein the parallel interface and test unit combination are designed for debugging the CPU hardware and associated software, of said computer system, comprising:
    (a) means for supplying a preselected test instruction sequence specified by said test unit to said processor via said instruction bus;
    (b) means for enabling said test unit to store data into and retrieve data from said computer system via said data bus;
    (c) means for enabling said test unit to signal said processor to step through said preselected test sequence; and
    (d) means for communicating signals from said processor to said test unit, which enable said test unit to monitor said processor state, whereby test unit/parallel interface combination may be sued to debug the CPU hardware and associated software.

17. A parallel test interface as set forth in claim 16 which further includes means for enabling said test unit to signal said processor to halt instruction processing.

18. A parallel test interface as set forth in claim 16 which further includes means for enabling said test unit to signal said processor to resume instruction processing.

19. A parallel test as set forth in claim 16 which operates asynchronously with respect to said computer system.

20. A parallel test interface as set forth in claim 16 which further includes means for enabling said test unit to communicate a reset signal to said processor to cause said processor to enter a predefined reset state.

21. A parallel test interface as set forth in claim 16 which further includes means for enabling said test unit to drive the outputs of said processor to a high-impedance state.

22. A method for performing hardware and software testing of a single chip microprocessor (CPU), included in a reduced instruction set computer (RISC) system via, an external test unit coupled to said chip over a parallel test interface, comprising the steps of:
 (a) monitoring said CPU via said test unit, over said interface, to determine which of a plurality of processing modes said CPU is in;
 (b) signalling said CPU, via said test unit, over said interface, to direct said CPU to enter a specified one of said processing modes;
 (c) coupling said test unit to the instruction bus of said RISC system to thereby enable said unit to place instructions directly onto said bus; and
 (d) coupling said test unit to the data bus of said RISC system to thereby enable said unit to place data directly onto and take data directly off of said data bus, whereby the test unit/parallel interface combination may be used to debug the CPU hardware and associated software.

23. A method for testing as set forth in claim 22 further comprising the step of placing a test instruction onto said instruction bus via the aforesaid test unit/instruction bus coupling.

24. A method for testing as set forth in claim 23 further comprising the step of inputting preselected code signals to said CPU via said test unit, over said interface, which causes said processor to execute said test instruction.

25. A method for testing as set forth in claim 24 further comprising the step of outputting the condition of predetermined processor registers to said test unit over said interface, following the execution of said test instruction.

26. A method for testing as set forth in claim 22 which further comprises the step of communicating a reset signal via said test unit, over said interface, to said processor to cause said processor to enter a predefined reset state.

27. A method for testing as set forth in claim 22 which further comprises the step of driving the outputs of said processor to a high-impedance state in response to a test mode signal being communicated by said test unit, to said CPU, over said interface.

28. A method for testing as set forth in claim 22 which is performed asynchronously with respect to said computer system.

29. A method for performing hardware an software testing of a single chip microprocessor (CPU), included in a reduced instruction set computer (RISC) system, via and external test unit coupled to said chip over a parallel test interface, wherein said computer system includes an instruction bus and a data bus which couple said processor to the memory of said computer system, comprising the steps of:
 (a) supplying a preselected test instruction sequence, specified by said test unit, to said processor via said instruction bus;
 (b) enabling said test unit to store data into and retrieve data from said computer system via said data bus;
 (c) signalling said processor, via said test unit, over said interface, to step through said preselected test sequence and
 (d) monitoring said processor state via said test unit, over said interface, whereby the test unit/parallel interface combination may be used to debug the CPU hardware and associate software.

30. A method for testing set forth in claim 29 which further comprises the step of utilizing said test unit to signal said processor to halt instruction processing wherein said signal to halt is carried via said interface.

31. A method for testing as set forth in claim 29 which further comprises the step of utilizing said test unit to signal said processor to resume instruction processing wherein said signal to resume processing is carried via said interface.

32. A method for testing as set forth in claim 29 which is performed asynchronously with respect to said computer system.

33. A method for testing as set forth in claim 29 which further comprises the step of utilizing said test unit to communicate a reset signal to said processor, to cause said processor to enter a predefined reset state, wherein said reset signal is carried over said interface.

34. A method for testing as set forth in claim 29 which further comprises the step of utilizing said test unit to drive the outputs of said processor to a high-impedance state in response to a test mode signal communicated from said test unit to said CPU over said interface.

* * * * *